(12) United States Patent
Grueso

(10) Patent No.: US 11,557,426 B2
(45) Date of Patent: Jan. 17, 2023

(54) ISOLATED SWITCHMODE POWER SUPPLIES HAVING QUASI-PLANAR TRANSFORMERS

(71) Applicant: Astec International Limited, Kowloon (HK)

(72) Inventor: Alfredo Belmonte Grueso, Teresa (PH)

(73) Assignee: Astec International Limited, Kowloon (HK)

( * ) Notice: Subject to any disclaimer, the term of this patent is extended or adjusted under 35 U.S.C. 154(b) by 323 days.

(21) Appl. No.: 16/809,112

(22) Filed: Mar. 4, 2020

(65) Prior Publication Data

US 2021/0280364 A1 Sep. 9, 2021

(51) Int. Cl.
| | | |
|---|---|---|
| *H01F 27/24* | (2006.01) | |
| *H01F 27/32* | (2006.01) | |
| *H01F 27/34* | (2006.01) | |
| *H01F 41/12* | (2006.01) | |
| *H02M 7/00* | (2006.01) | |

(52) U.S. Cl.
CPC ............ *H01F 27/32* (2013.01); *H01F 27/24* (2013.01); *H01F 27/346* (2013.01); *H01F 41/12* (2013.01); *H02M 7/003* (2013.01)

(58) Field of Classification Search
CPC .... H01F 27/022; H01F 27/24; H01F 27/2823; H01F 27/2871; H01F 27/306; H01F 27/32; H01F 27/323; H01F 27/325; H01F 27/346; H01F 27/34; H01F 41/12; H02M 3/003; H02M 7/003; H02M 7/00
USPC ............... 361/821; 336/90; 29/602
See application file for complete search history.

(56) References Cited

U.S. PATENT DOCUMENTS

| | | | | |
|---|---|---|---|---|
| 4,318,067 | A | * | 3/1982 | Weiner .................. H01F 27/325 336/98 |
| 6,682,681 | B1 | | 1/2004 | Clark et al. |
| 2007/0058704 | A1 | * | 3/2007 | Alford ................. H01F 17/0013 375/222 |
| 2011/0254649 | A1 | * | 10/2011 | Hollevoet ........... H01F 27/2852 336/200 |
| 2015/0101854 | A1 | * | 4/2015 | Lee ........................ H01F 41/046 29/606 |
| 2018/0158593 | A1 | * | 6/2018 | Grueso ................. H01F 41/061 |

FOREIGN PATENT DOCUMENTS

| | | | | |
|---|---|---|---|---|
| KR | 20170105345 A | * | 9/2017 | ............. H01F 27/24 |
| WO | WO-2019180620 A1 | * | 9/2019 | ......... H01F 27/2804 |

* cited by examiner

*Primary Examiner* — Timothy J Thompson
*Assistant Examiner* — Guillermo J Egoavil

(57) ABSTRACT

An isolated switch-mode power supply includes at least one input, at least one output, and a power circuit coupled between the at least one input and the at least one output for converting an input voltage or current to an output voltage or current. The power circuit includes a transformer having one or more primary windings, one or more secondary windings, an electrical insulator, and a core magnetically coupling the one or more primary windings and the one or more secondary windings. Upper portions of the primary and secondary windings are covered with the electrical insulator. Other example switchmode power supplies, transformers, magnetic chokes and methods are also disclosed.

8 Claims, 11 Drawing Sheets

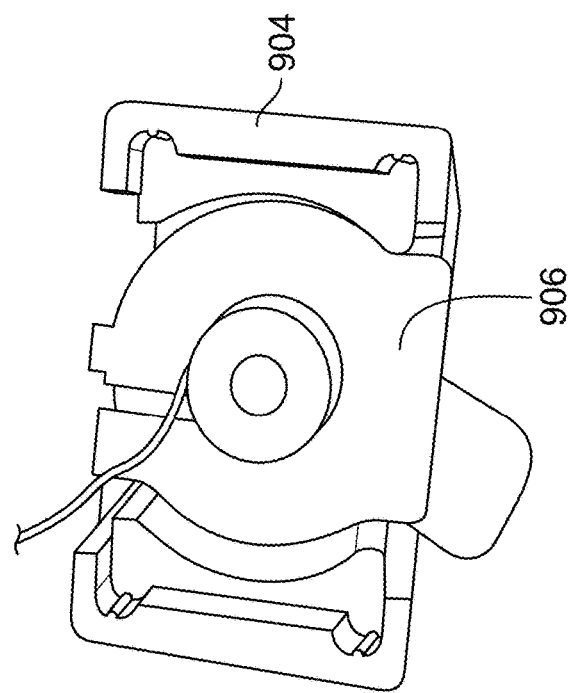
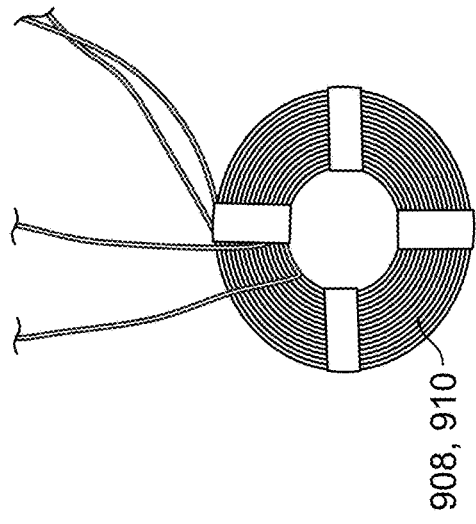
FIG. 9A
FIG. 9B
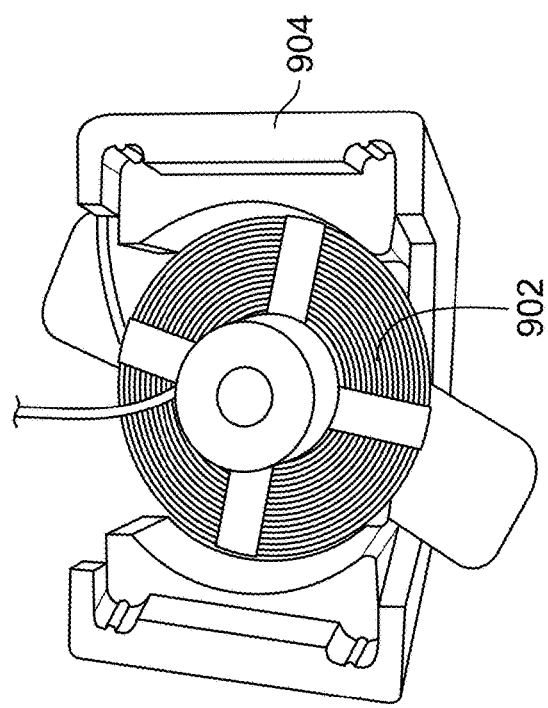
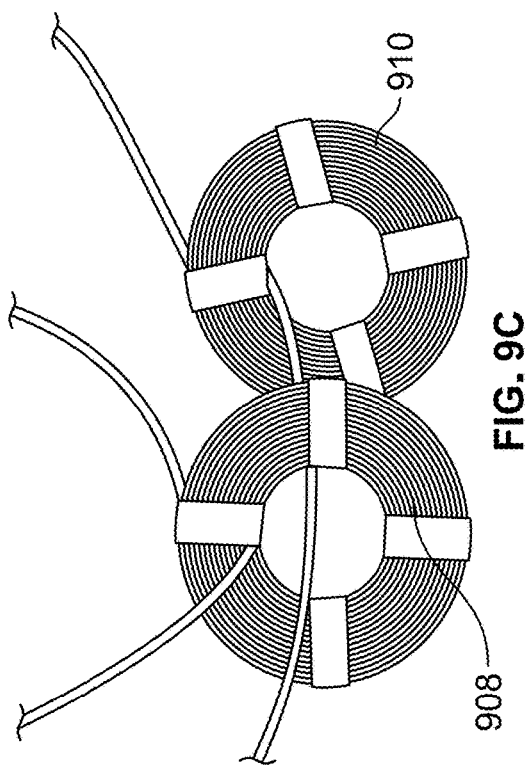
FIG. 9C
FIG. 9D

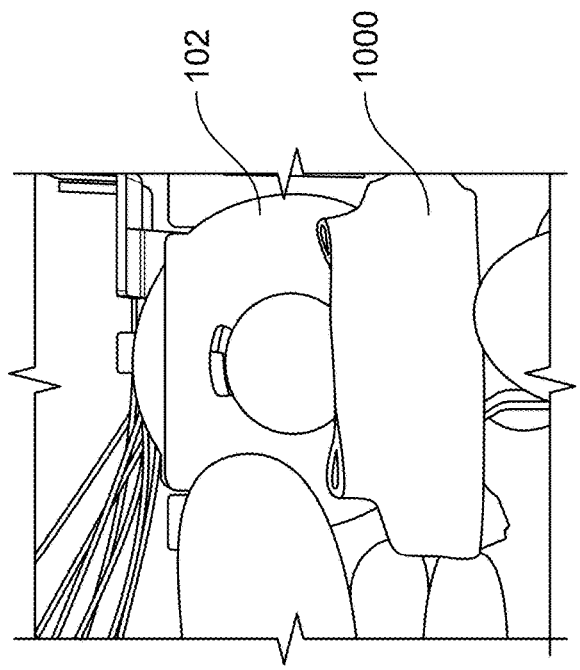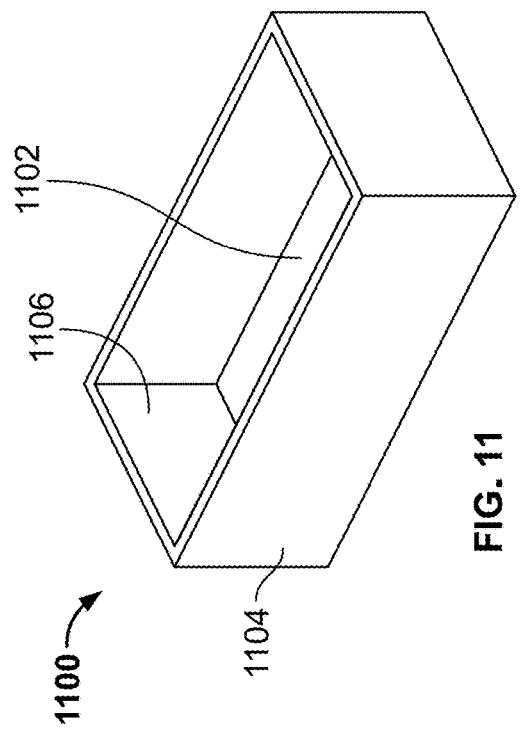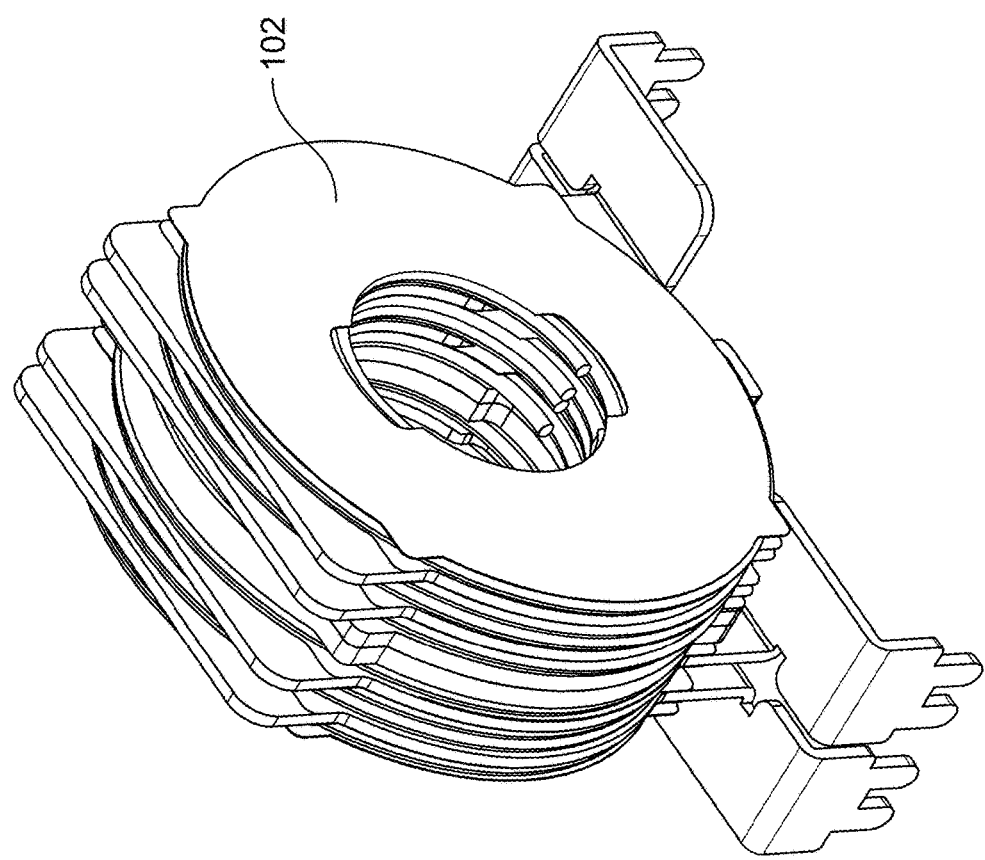
FIG. 10B
FIG. 11
FIG. 10A

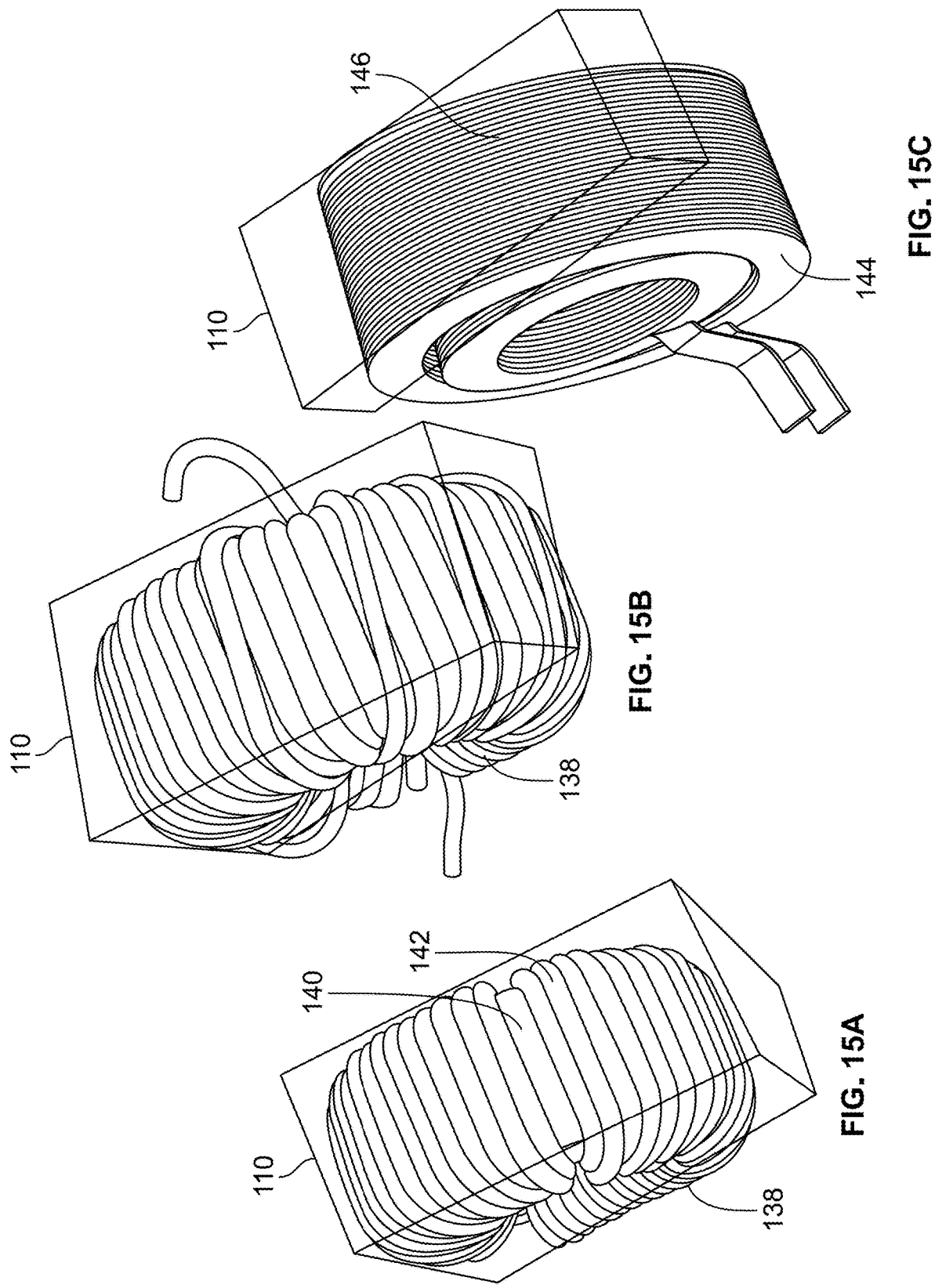

ISOLATED SWITCHMODE POWER SUPPLIES HAVING QUASI-PLANAR TRANSFORMERS

FIELD

The present disclosure relates to isolated switchmode power supplies, and in particular, isolated switchmode power supplies having quasi-planar transformers.

BACKGROUND

This section provides background information related to the present disclosure which is not necessarily prior art.

Quasi-planar transformers are commonly used in isolated switchmode power supplies and typically have "windings" formed of various types of wires and coils including thin copper sheets or triple insulated wire. As compared to conventional "wire-wound-on-a-bobbin" transformers, a quasi-planar transformer may have a higher power density, reduced height, greater surface area for heat dissipation, greater magnetic cross-section area (enabling fewer turns), lower leakage inductance, and/or less AC winding resistance.

SUMMARY

This section provides a general summary of the disclosure, and is not a comprehensive disclosure of its full scope or all of its features.

According to one aspect of the present disclosure, an isolated switch-mode power supply includes at least one input, at least one output, and a power circuit coupled between the at least one input and the at least one output for converting an input voltage or current to an output voltage or current. The power circuit includes a transformer having one or more primary windings, one or more secondary windings, an electrical insulator, and a core magnetically coupling the one or more primary windings and the one or more secondary windings. Upper portions of the primary and secondary windings are covered with the electrical insulator.

According to another aspect of the present disclosure, a quasi-planar transformer includes one or more primary windings, one or more secondary windings, a core magnetically coupling the one or more primary windings and the one or more secondary windings, and an electrical insulator. Upper portions of the primary and secondary windings are covered with the electrical insulator.

According to a further aspect of the present disclosure, a method includes applying an electrical insulator to only upper portions of one or more primary windings and one or more secondary windings of a quasi-planar transformer to form a substantially flat nonconductive surface extending above the upper portions of the primary and secondary windings. The method also includes assembling the one or more primary windings and the one or more secondary windings with one or more magnetic core segments.

According to yet another aspect of the present disclosure, an electrical component comprises an annular core, a winding including a wire extending around the core, and an electrical insulator. An upper portion of the winding is covered with the electrical insulator, and a lower portion of the winding is not covered with an electrical insulator.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 9A-H are perspective views of components of a winding assembly at various points of assembly.

FIG. 10A is an orthogonal view of the winding assembly.

FIG. 10B is a side view of the winding assembly of FIG. 10A including an optional clip.

FIG. 11 is an orthogonal view of a mold.

Figure 12:
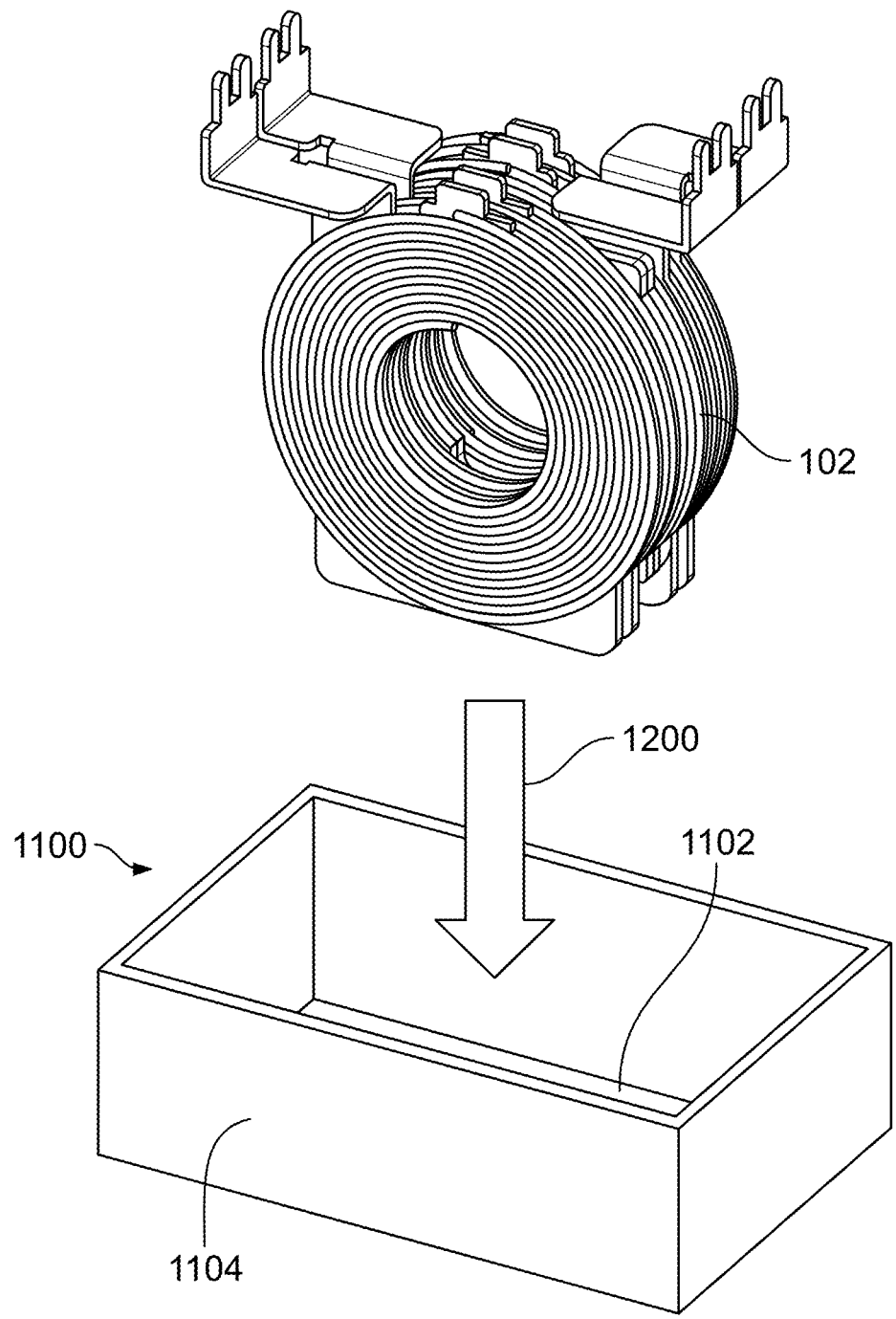

FIG. 12 is a perspective view of inserting the winding assembly of FIG. 10A into the mold of FIG. 11.

Figure 13:
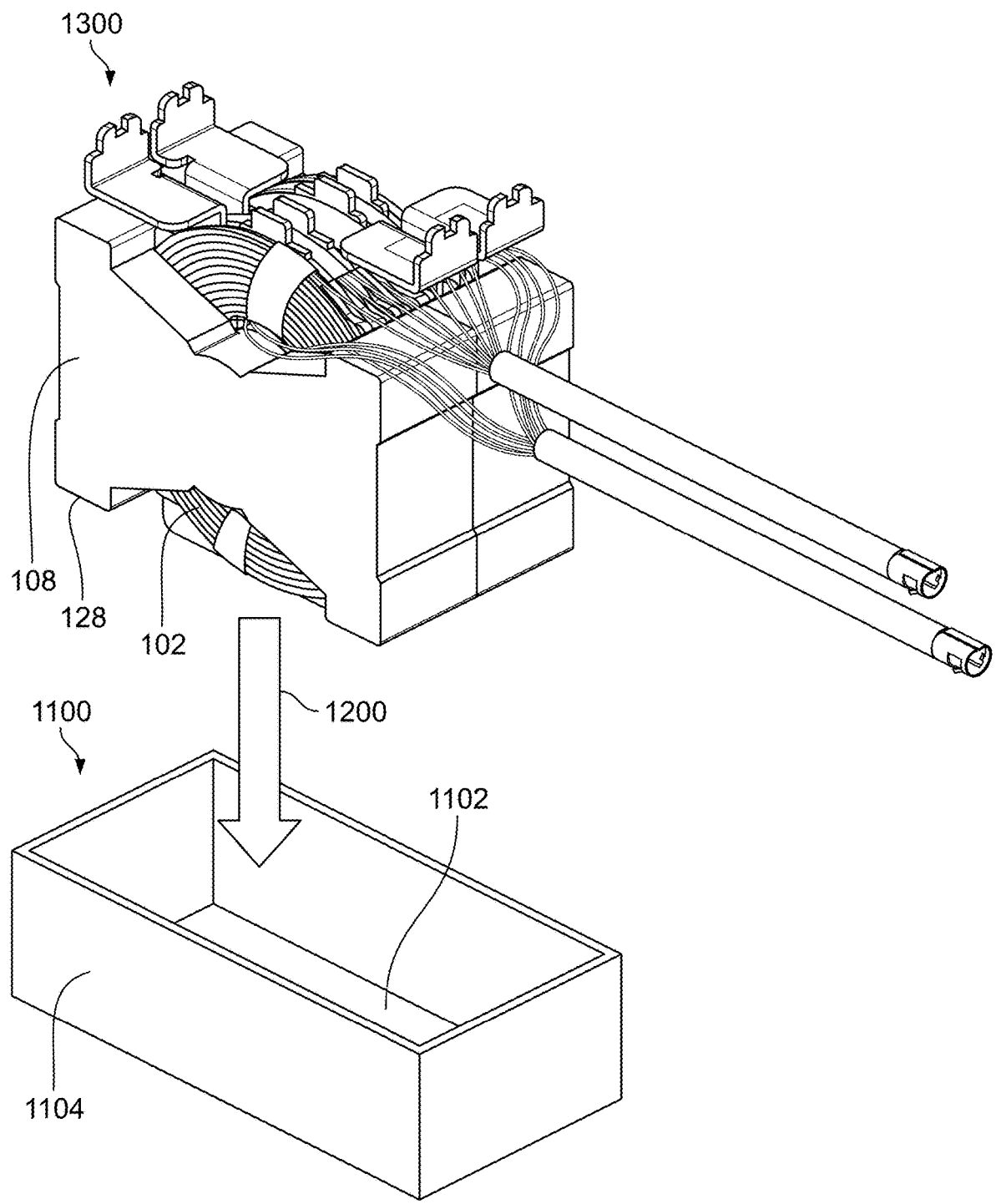

FIG. 13 is a perspective view of inserting a transformer into the mold of FIG. 11.

Figure 14B:
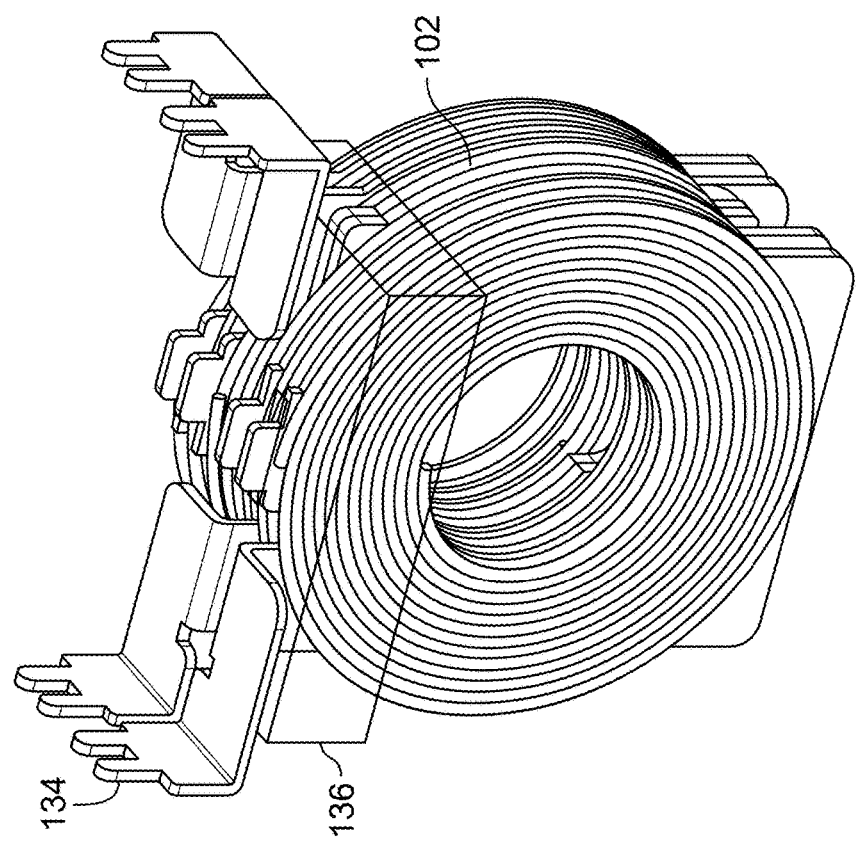
Figure 14A:
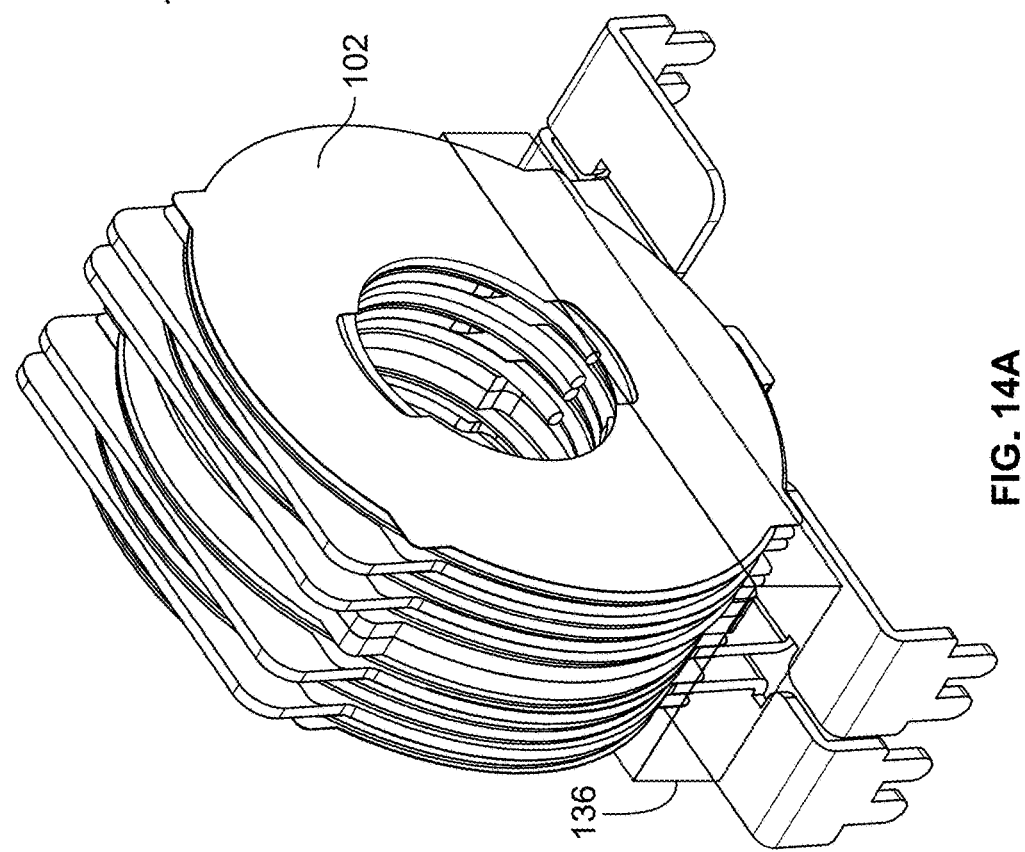

FIG. 14A is a perspective view of an alternate transformer without the core.

FIG. 14B is an alternate perspective view of the transformer of FIG. 14A, illustrating a bottom of the transformer without the core.

FIG. 15A is a perspective view of an example magnetic choke according to another aspect of the present disclosure.

FIG. 15B is a perspective view of another example magnetic choke.

FIG. 15C is a perspective view of still another example magnetic choke.

Corresponding reference numerals indicate corresponding parts or features throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
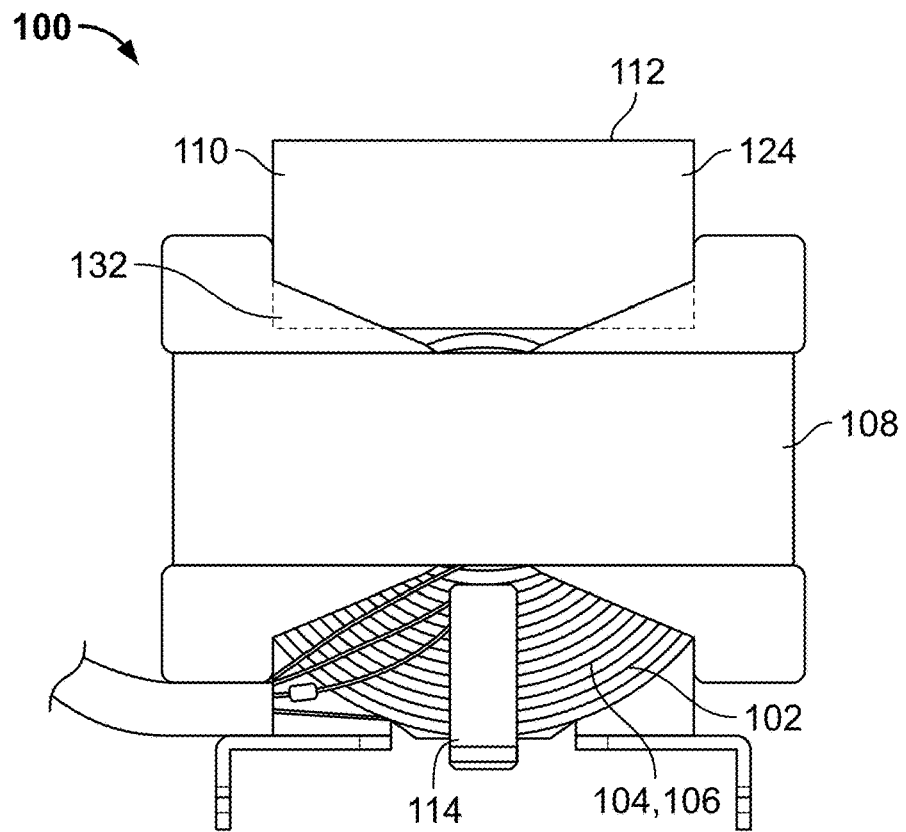
FIG. 1 is a side view of an example transformer.

A transformer according to one example embodiment of the present disclosure is illustrated in FIG. 1 and indicated generally by reference number 100. The transformer 100 includes a winding assembly 102 having one or more primary windings 104 and one or more secondary windings 106. The transformer 100 also includes a core 108 which magnetically couples the primary windings 104 and the secondary windings 106.

As shown in FIG. 1, an electrical insulator 110, which serves as a covering, is disposed on the winding assembly 102 and partially encapsulates the winding assembly 102. The electrical insulator 110 also includes a substantially flat upper surface 112. In the exemplary embodiment, the electrical insulator 110 covers upper portions of the primary and secondary windings 104, 106 and does not cover lower portions of the primary and secondary windings 104, 106. Alternatively, the lower portions of the primary and secondary windings 104, 106 are covered by an electrical insulator and the upper portions of the primary and secondary windings 104, 106 are not covered by the electrical insulator 110. In some embodiments, the upper portions and the lower portions of the primary and secondary windings 104, 106 are each covered by an electrical insulator, without fully encapsulating the windings 104, 106 or the transformer 100.

In the exemplary embodiment, the primary windings 104 and the secondary windings 106 are positioned generally vertically and each have a central opening. Alternate configurations of the winding assembly 102 are contemplated to satisfy various design requirements such as efficiency, power density, etc. For example, as shown in FIG. 1, the primary and secondary windings 104, 106 arranged as a quasi-planar transformer configuration. In some embodiments, the primary and secondary windings 104, 106 are interleaved. Unlike planar transformers which utilize PCB windings, the windings 104, 106 may include various types of windings such as copper plates (e.g., stamped copper plates, rectangular copper coils, bus bar plates, etc.) and/or self-bonded or non-self-bonded insulated wire windings (e.g., single-insulated, double-insulated, triple-insulated). The windings 104, 106 may also include various types of wires and coils that are twisted, bunched, litz, round, rectangular, flat litz, etc. Other windings and/or other configurations of windings may be used herein. In some embodiments, non-self-bonded insulated wire windings are included in winding assembly 102 and are taped with tape 114.

The electrical insulator 110 is composed of an encapsulant material. The encapsulant material is suitable to retain the primary windings 104 and the secondary windings 106 in a fixed position, such as to maintain appropriate or desired spacing between the windings 104, 106, and to integrate the components of the winding assembly 102 into a single piece. In some embodiments, the electrical insulator 110 is composed of an ultraviolet (UV) curable encapsulant material. The UV curable material is cured by irradiating the electrical insulator 110 with a UV light source. UV curable materials often have a short cure time such that exposure to a UV light can occur during in-line production of the transformer 100. For example, the electrical insulator 110 is cured by irradiating with a UV light to retain the winding assembly 102 in a fixed position with respect to the electrical insulator 110. In alternate embodiments, the electrical insulator 110 is composed of a heat-curable material and cured by applying heat to the electrical insulator 100. In some embodiments, the electrical insulator 110 is allowed to cure by waiting a sufficient time for the material to cure. Alternatively, the electrical insulator 110 may any suitable material able to retain the winding assembly 102 in a fixed position such that the winding assembly 102 (and the components of the winding assembly 102 including primary and secondary windings 104, 106) cannot move relative to the electrical insulator 110.

Figure 2:
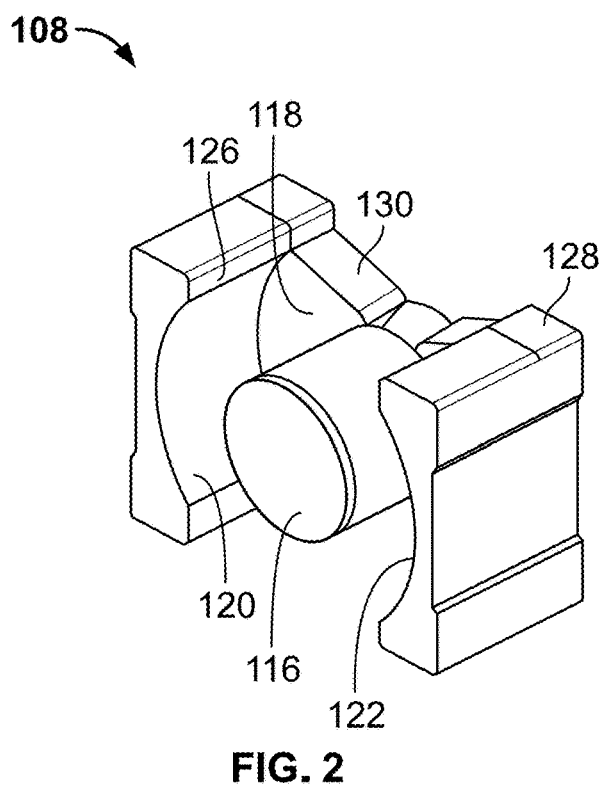
FIG. 2 is a perspective view of a core included in the transformer of FIG. 1.

One half of an exemplary core 108 is illustrated in FIG. 2. The core 108 may comprise any suitable material, such as a magnetic material. In the exemplary embodiment, the core 108 includes two segments or halves and each half of the core 108 is generally identical. Each half of the core 108 includes a central post 116, a first surface 118, a second surface 120, and a third surface 122. Surfaces 118, 120, and 122 are inner surfaces or inner portions of the core. The central post 116 and the surfaces 118, 120, 122 of each half of the core 108 at least partially define a cavity for receiving the winding assembly 102 between the two halves of the core 108. That is, when the primary and secondary windings 104, 106 are assembled with the core 108, the primary and secondary windings 104, 106 are positioned around the central post 116 and adjacent or between the surfaces 118, 120, 122. In addition, each half of the core 108 is coupled to the electrical insulator 110. In some embodiments, side surface 124 of the electrical insulator 110 (as shown in FIG.

1) is positioned to contact the first surface 118 of the core 108 and surface 126. In this way, the electrical insulator 110 ensures proper spacing between the core 108 and the components of the winding assembly 102. In alternate embodiments, the electrical insulator 110 is coupled to the core 108 without contacting the first surface 118. For example, in embodiments where the electrical insulator 110 is applied after the core 108 is assembled with the primary and secondary windings 104, 106, the electrical insulator 110 is coupled to an upper surface 128 and/or an upper surface 130 of the core 108.

In some embodiments, it is desirable to construct the electrical insulator 110 as thin as possible for material savings purposes and to achieve a compact winding design. In one embodiment, when accounting for manufacturing considerations, the thickness of the electrical insulator 110 above the primary and secondary windings 104, 106 is at least 0.4 millimeters, the thickness between adjacent windings included in the primary and secondary windings 104, 106 is at least 0.1 millimeters, and the thickness between the windings and the core 108 is at least 0.4 millimeters. The electrical insulator may include different thicknesses in other embodiments.

As shown in the exemplary embodiment of FIG. 1, the core 108 covers a portion 132 of the side surface 124 of the electrical insulator 110 (as indicated by dotted lines). The portion 132 of the electrical insulator 110 is coupled to the first surface 118 of the core 108. The electrical insulator 110, and in particular the portion 132, is of sufficient thickness to ensure a gap is maintained between the winding assembly 102 and the core 108. Such a gap prevents damage to the winding assembly 102 and/or the core 108, without the need for tape to secure or insulate the winding assembly 102 from the core 108.

Figure 3:
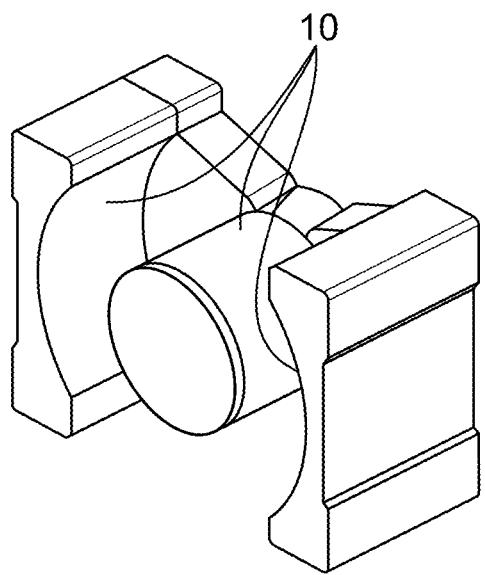
FIG. 3 is a perspective view of a core including tapings.
Figure 4:
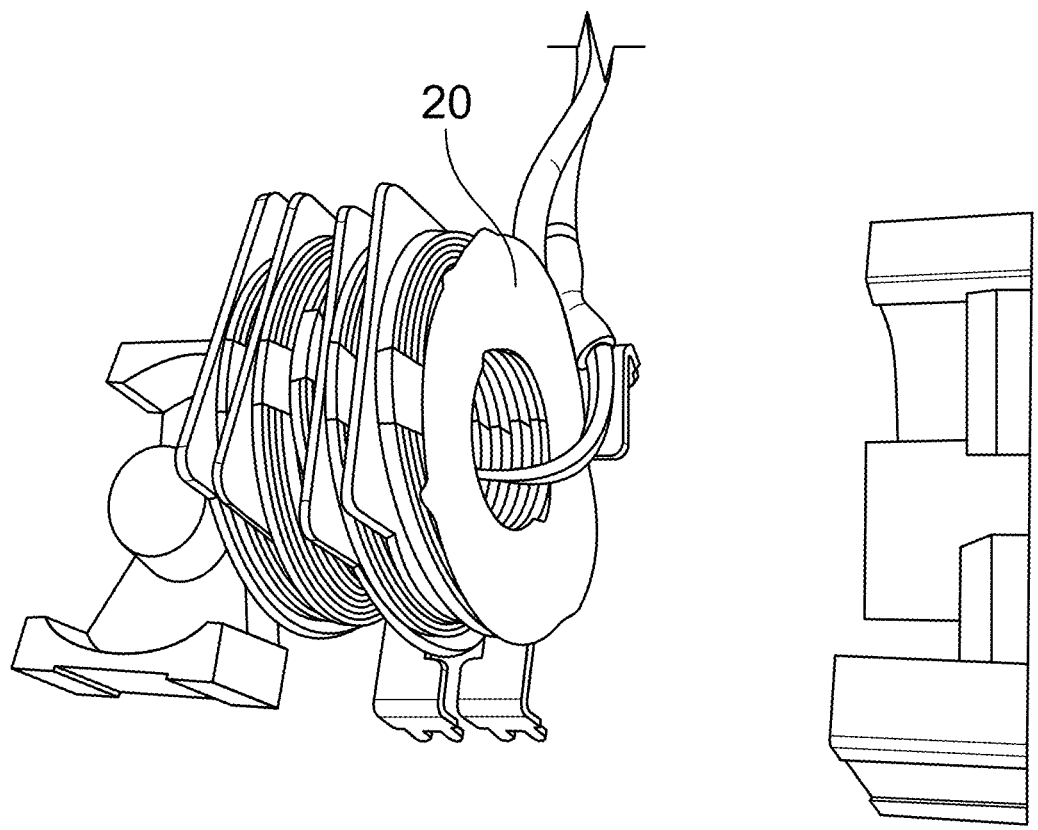
FIG. 4 is a perspective view of a transformer including a film.

FIG. 3 illustrates an alternative core that includes tape on surfaces 10 to prevent damage to the windings and/or core during assembly of a transformer (e.g., a planar or quasi-planar transformer). Tape may be applied to these surfaces 10 by an automatic core taping machine which adds expense to the assembly process. By including the electrical insulator 110 in a transformer, tape may be eliminated from these surfaces 10, which reduces costs associated with transformer production, including machinery costs. And, as shown in FIG. 4, some configurations of transformers include a film 20, such as Mylar® film or Nomex® paper, to prevent damage to the windings and/or core of the transformers. In some embodiments, the use of the electrical insulator 110 in a transformer eliminates the need for the film 20.

Figure 5:
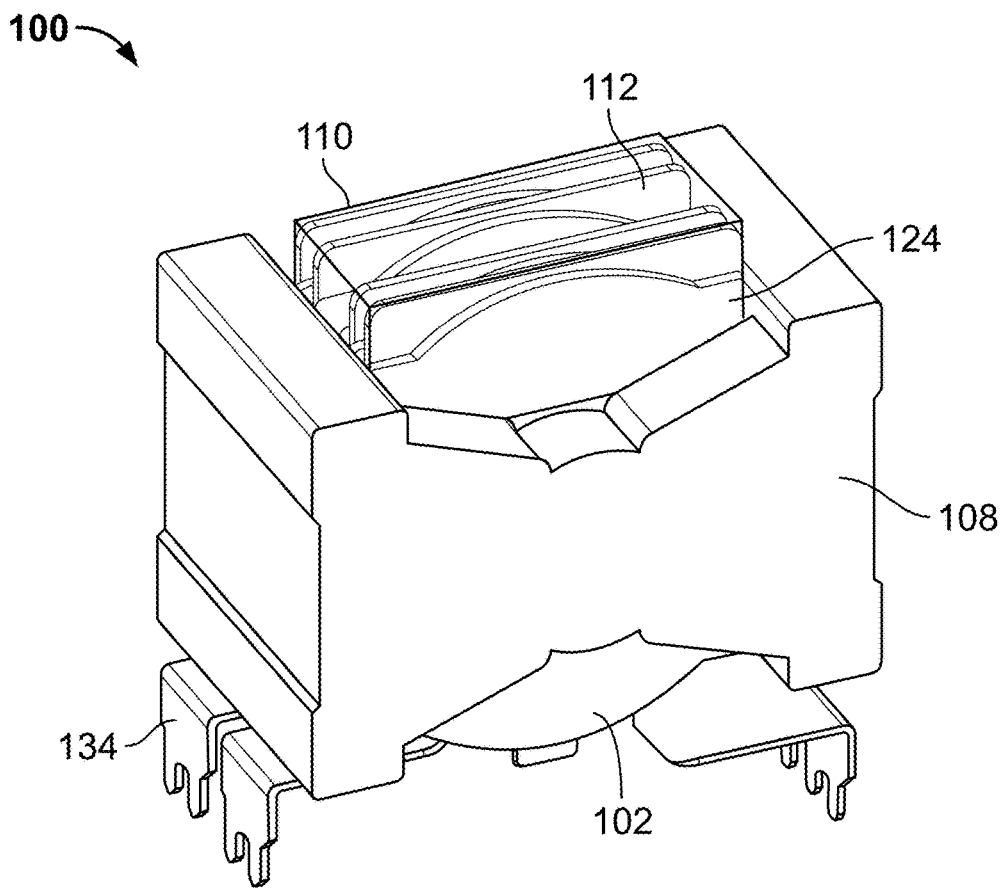
FIG. 5 is a perspective view of the transformer of FIG. 1.

FIG. 5 depicts an exemplary transformer 100. The transformer 100 also includes bus bar terminals 134 which are adjacent to a bottom surface of the core 108. For purposes of illustration, the electrical insulator 110 is substantially transparent such that the upper portion of the winding assembly 102 is visible through the electrical insulator 110. The electrical insulator 110 partially encapsulates the winding assembly 102, and in this way, the components of the winding assembly 102 (e.g., the primary windings 104, the secondary windings 106, etc.) are secured in a fixed position. This is accomplished without entirely encapsulating the winding assembly 102 and/or the transformer 100. For example, in some embodiments, the electrical insulator 110 encapsulates less than half of the winding assembly 102 (e.g., less than half of each of the primary and secondary windings 104,106). In other embodiments, the electrical insulator 110 encapsulates only an upper portion of the winding assembly 102 such that electrical insulator 110 does not obstruct a central opening of the winding assembly 102 (i.e., the central post 116 of the core 108 is permitted to pass through the central opening of the winding assembly 102). In still other embodiments, the electrical insulator 110 encapsulates at least portion of the winding assembly 102 that extends beyond the upper surfaces 128, 130 of the core 108 (e.g., a portion of the winding assembly 102 that remains exposed when the core 108 is coupled to the winding assembly 102).

With continued reference to FIG. 5, the electrical insulator 110 is sized and shaped for engagement with a "pick and place" device (not shown) such that the transformer 100 may be moved and placed on a circuit board, where the transformer 100 is electronically coupled to the circuit board. In particular, the substantially flat surface 112 of the electrical insulator 110 is suitable for receiving a suction-type "pick and place" device of an automated insertion machine (not shown). The surface 112 is flat, or at least substantially flat, to ensure the suction device can properly engage with the electrical insulator 110 (e.g., form a seal between the suction device and the surface 112). For example, a suction-type device of the automated insertion assembly engages, via suction, with the surface 112 of the electrical insulator 110 to pick up, move, relocate, and/or insert the transformer 100 as desired (e.g., move a transformer from one location to another location to place the transformer on a circuit board).

The electrical insulator 110 further includes a plurality of side surfaces 124 which are perpendicular to the surface 112. Alternatively, the side surfaces 124 are oriented at one or more other suitable angle(s) (e.g., an angle suitable for removing the electrical insulator 110 from a mold, etc.). In some embodiments, a grip-type device such as a claw or a gripper of the automated insertion assembly frictionally engages with two or more side surfaces 124 of the electrical insulator 110 to pick up, move, and/or insert the transformer 100 as desired. For example, the automated insertion assembly picks up and/or moves the transformer 100 from a first location to a second location, such as a circuit board, by engaging with the surface 112 and/or the side surfaces 124 of the electrical insulator 110. As such, the electrical insulator 110, in particular the substantially flat surface 112 and the plurality of side surfaces 114, is sized and shaped to engage with a variety of gripping devices attachable to automated assertion assemblies for automated production.

Figure 6:
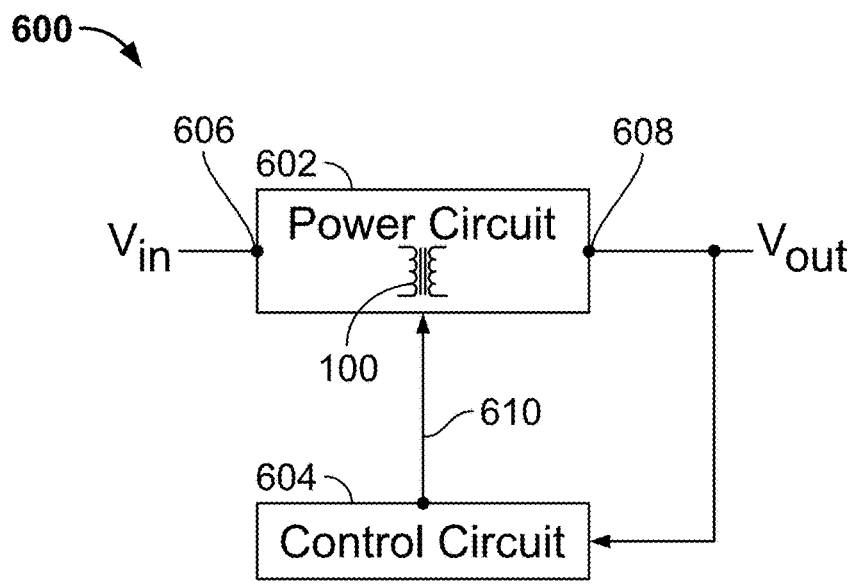
FIG. 6 is a block diagram of a switchmode power supply (SMPS) including the transformer of FIG. 1.

As described above, the transformer 100 is suitable for use in a circuit board with any suitable circuit topologies, such as a power supply. In some embodiments, the transformer 100 is used in a switchmode power supply (SMPS). FIG. 6 illustrates a SMPS 600 according to one example embodiment of the present disclosure that includes the transformer 100. As shown in FIG. 6, the SMPS 600 includes a power circuit 602 and a control circuit 604. The power circuit 602 includes an input 606 for receiving an input voltage Vin, the transformer 100 including primary windings 104 and secondary windings 106, and an output 608 for providing an output voltage Vout. As shown in FIG. 6, the control circuit 604 is coupled to the power circuit 602 for regulating the output voltage Vout. Alternatively, the control circuit 604 is coupled to the power circuit 602 for regulating the input voltage Vin. The control circuit 604 is configured to generate a control signal 610. The components included in SMPS 600 are exemplary only and the transformer 100 is contemplated for use in other circuit topologies, including any other suitable isolated SMPS topologies.

Figure 7:
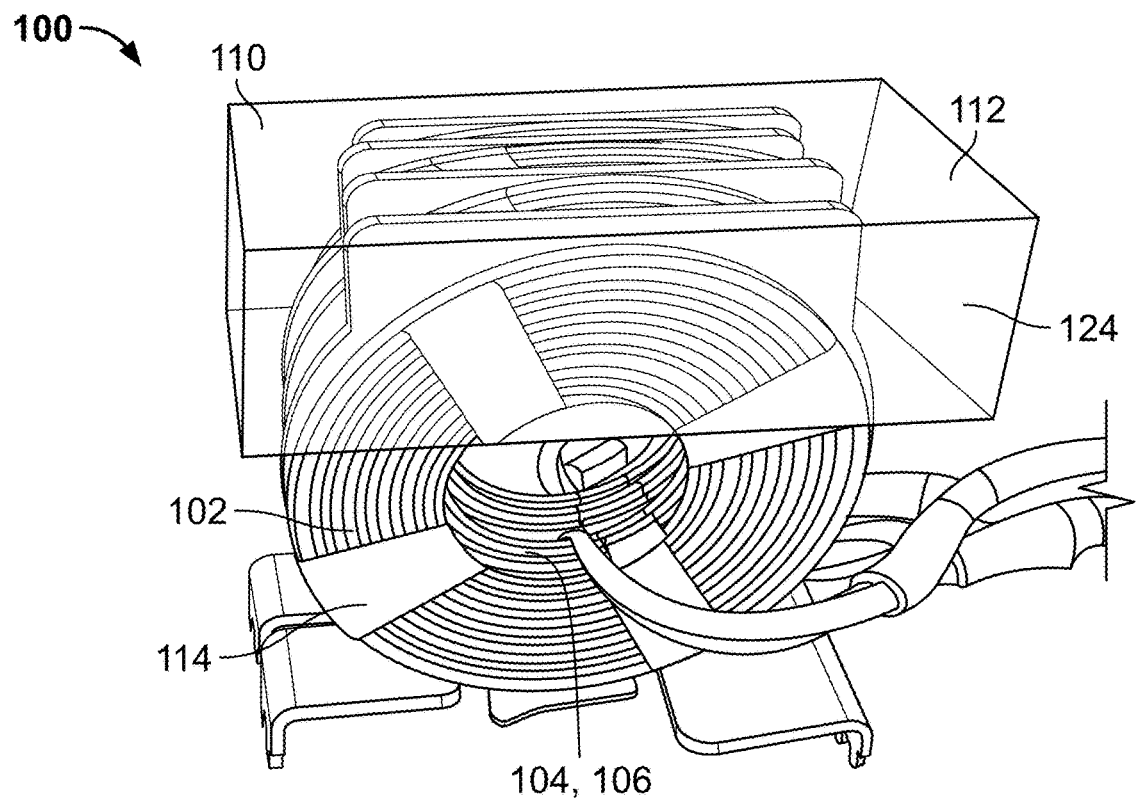
FIG. 7 is a perspective view of the transformer of FIG. 1, without the core.
Figure 8:
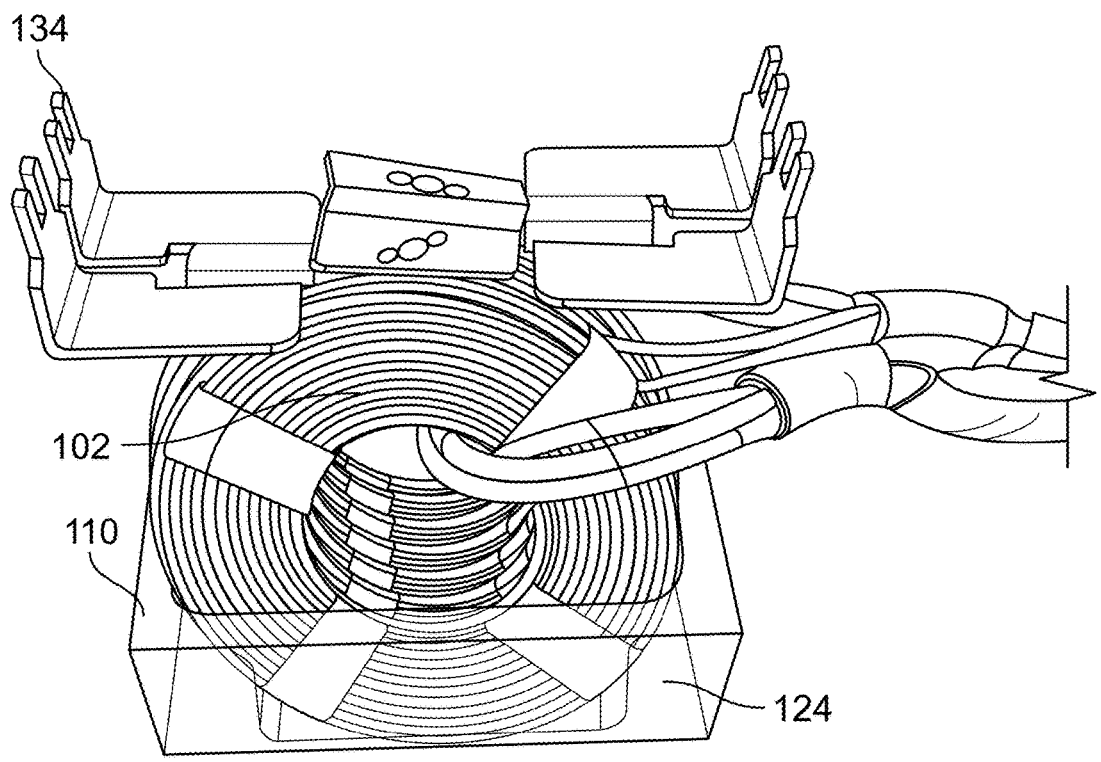
FIG. 8 is an alternate perspective view of the transformer of FIG. 7, illustrating a bottom of the transformer without the core.

FIGS. 7 and 8 depict a transformer 100 without the core 108. As shown in FIG. 7, the electrical insulator 110 partially encapsulates an upper portion of the winding assembly 102 such that the primary windings 104 and the secondary windings 106 are retained in a fixed position. In the embodiment shown in FIG. 8, the bottom portion of the winding assembly 102 is not encapsulated by the electrical insulator 110. By including a portion of the winding assembly 102 that is not encapsulated, such uncovered portions may facilitate improved heat transfer. The electrical insulator 110 is directly coupled to the upper portion of the winding assembly 102, such as by applying a material to the upper portion of the primary and secondary windings 104, 106 and curing the material to form the electrical insulator 110. In some embodiments, the upper portion of the winding assembly 102 is dipped into a mold filled with an electrical insulator or encapsulant material and after the material is set or cured, the winding assembly 102 and the encapsulant material are removed from the mold. Alternatively, the electrical insulator 110 may be formed or molded of a rigid or semi-rigid nonconductive material (e.g., of a plastic material) apart from the winding assembly 102 and subsequently coupled to the winding assembly 102. The rigid or semi-rigid nonconductive cover is sized and shaped to cover over only the upper portions of the primary and secondary windings 104, 106.

In some embodiments, the electrical insulator 110 partially encapsulates the winding assembly 102 such that no additional tape is necessary to insulate or protect the winding assembly 102 and/or the core 108. That is, no tape is applied to the core 108. Instead, the electrical insulator 110 maintains a desired separation and/or insulation between the winding assembly 102 and the core 108 and between the components of the winding assembly. In particular, the electrical insulator 110 extends beyond the winding assembly 102 by a certain distance, such that when the core 108 is coupled to the electrical insulator 110, the electrical insulator 110 prevents the core 108 from directly contacting the winding assembly 102. Because the electrical insulator 110 retains the winding assembly 102 in a fixed position, a compact winding design can be achieved without the windings being scratched or damaged during assembly.

Figure 9F:
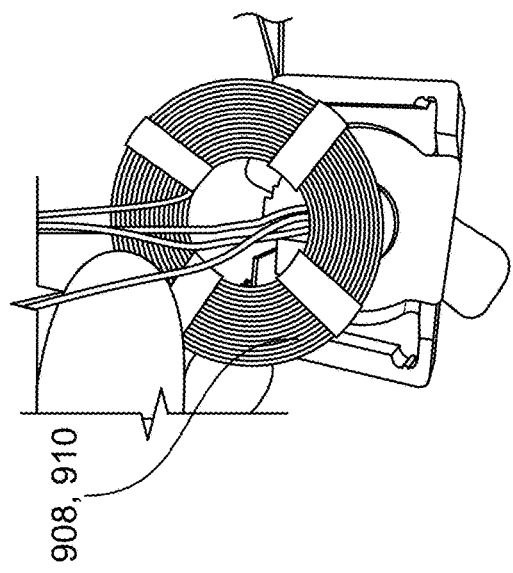
Figure 9H:
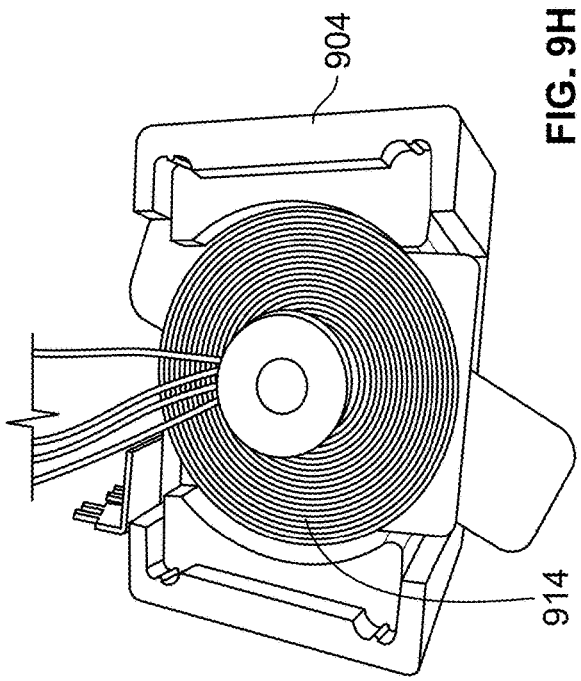
Figure 9E:
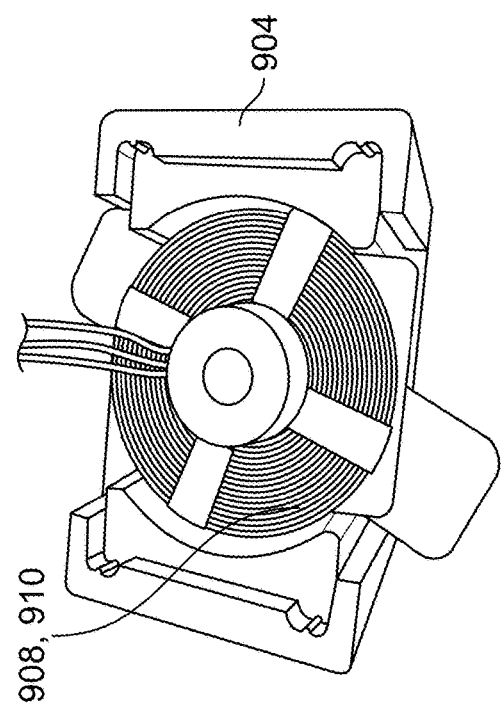
Figure 9G:
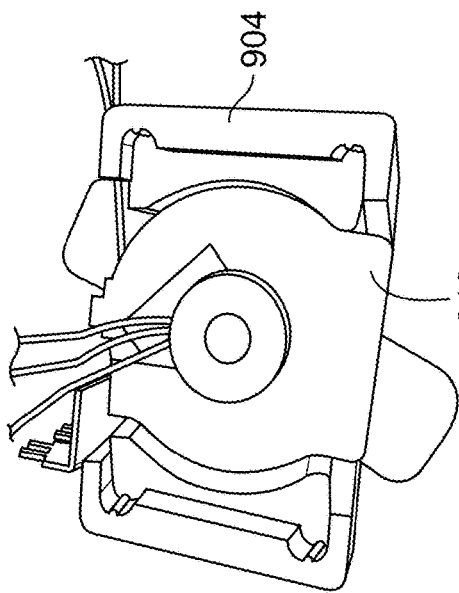

According to another aspect of the present disclosure, a method of manufacturing a transformer 100 is disclosed. FIGS. 9A-9H depict an exemplary method of assembling the primary and secondary windings 104, 106 for a quasi-planar transformer. Initially, a first winding coil 902 is inserted into an aligner jig 904 (FIG. 9A). After the first winding coil 902 is inserted into the aligner jig 904, a first bus bar plate winding 906 is inserted into the aligner jig 904 on top of the first winding coil 902 (FIG. 9B). Then, a second winding coil 908 and a third winding coil 910 are combined (FIG. 9C) and the central openings of the winding coils 908, 910 are aligned (FIG. 9D). The combined winding coils 908, 910 are then inserted into the aligner jig 904 on top of the first bus bar plate winding 906 (FIGS. 9E-9F). A second bus bar plate winding 912 is then inserted into the aligner jig 904 on top of the combined winding coils 908, 910 (FIG. 9G). A fourth winding coil 914 is inserted into the aligner jig 904 on top of the second bus bar plate winding 912 (FIG. 9H). The process (as shown in FIGS. 9A-9H) may be repeated until all coils are completely assembled, forming winding assembly 102 (shown in FIG. 10A). The bus bar plate windings 906, 912 include terminals, such as bus bar terminals 134. Additionally, the aligner jig 904 may include features to control the spacing of the coils and bus bar windings.

As shown in FIG. 10A, the upper portions of the winding coils (e.g., 902, 908, 910, 914) and the bus bar plates (e.g., 906, 912) are of different shapes and/or heights such that the winding assembly 102 does not include a flat upper surface that is suitable for engaging with a grip-type or suction-type pick and place machine. To provide such a surface, the method includes applying an electrical insulator 110 to only upper portions of the primary windings 104 and the secondary windings 106 of the quasi-planar transformer to form a substantially flat nonconductive surface (e.g., surface 112) extending above the upper portions of the primary and secondary windings. In some embodiments, applying the electrical insulator 110 includes dispensing a material for the electrical insulator 110 into a mold 1100 and inserting or dipping the winding assembly 102 into the mold 1100 such that the winding assembly is partially inserted into the material.

In some embodiments, the electrical insulator 110 is applied to the winding assembly 102 while the winding assembly is within the aligner jig 904. While in the aligner jig 904, the spacing of the windings of the winding assembly 102 is controlled. However, with respect to non-self-bonded coil windings for example, once the windings are removed from the aligner jig 904, the windings often cannot keep their spacing, form, and/or flatness. By applying the electrical insulator 110 while the windings are within the aligner jig 904, a compact winding design can be achieved which ensures the windings are secured in a fixed position with proper spacing. After the electrical insulator 110 has cured or set, the winding assembly 102 is removed from the aligner jig 904. In some embodiments, a clip 1000 (shown in FIG. 10B) may be used to hold the completely assembled winding assembly 102 in place prior to the molding process, as described in more detail below. Alternatively, an adhesive, such as an instant glue, may be used to hold the assembled winding assembly 102 in place.

An exemplary mold is illustrated in FIG. 11. In the exemplary embodiment, mold 1100 is a substantially rectangular container having a substantially flat inner surface 1102 and side walls 1104. The inner surface 1102 corresponds to the substantially flat surface 112 of electrical insulator 110, shown in FIG. 1. Side walls 1104 extend perpendicularly (or at another suitable angle) from the inner surface 1102 and define an opening 1106 of the mold 1100. Various different sizes and/or configurations of mold 1100 are contemplated dependent on core geometry and size. The material for the electrical insulator 110, such as an encapsulant material, is dispensed into the mold 1100 and the material is received in between the inner surface 1102 and side walls 1104. A specified amount of the material is dispensed into the mold 1100 such that the material partially encapsulates only upper portions of the primary and secondary windings 104, 106 of the winding assembly 102 when the windings 104, 106 are inserted. The amount of material is pre-determined according to core size and geometry as well as identified surfaces to be covered by the electrical insulator 110. The method may also include leveling the mold 1100 and/or leveling the material within the mold 1100.

After the encapsulant material is dispensed into the mold 1100, the winding assembly 102 is inserted or dipped 1200 into the mold 1100 through the opening 1106, as shown in FIG. 12. The opening 1106 is sized and shaped to receive the inserted winding assembly 102 such that the winding assembly 102 does not contact the inner surface 1102 and/or the side walls 1104 of the mold 1100. To ensure the windings 104, 106 do not contact the mold 1100, the mold 1100 optionally includes embedded spacers (not shown) that are positioned based on core geometry. Only the upper portions of the primary and secondary windings 104, 106 are inserted into the material, rather than submerging and/or inserting the entire winding assembly 102 into the material. In this way, the winding assembly 102 of the quasi-planar transformer is only partially encapsulated, rather than full encapsulation of the quasi-planar transformer.

In alternate embodiments, the material for the electrical insulator 110 is applied to the winding assembly 102 using an applicator. That is, rather than dispensing material into a mold, the material is applied (e.g., directly applied) with an applicator to only the upper portions of the primary and secondary windings 104, 106 of the quasi-planar transformer. For example, for transformer assemblies having complex winding configurations, applying the material for the electrical insulator 110 with an applicator may ensure proper application of the material for the electrical insulator 110 to the winding assembly 102.

Alternatively, an electrical insulator 110 may be applied to the quasi-planar transformer by placing a rigid or semi-rigid nonconductive cover over the upper portions of the primary and secondary windings 104, 106. This nonconductive cover, or molded header, may be formed separately from the quasi-planar transformer and subsequently coupled to the upper portions of the primary and secondary windings 104, 106. In some embodiments, the rigid or semi-rigid nonconductive cover may be formed of a plastic material.

After the electrical insulator 110 is applied to upper portions of the primary and secondary windings 104, 106 of the winding assembly 102, either using a mold 1100 or an applicator, the method further includes allowing the electrical insulator 110 to cure. In some embodiments, curing the electrical insulator 110 includes irradiating the electrical insulator 110 with an ultra-violet (UV) light, for example when the electrical insulator 110 is of a UV-curable encapsulant material. Such UV-curable encapsulants have a short curing time when exposed to UV light and may be cured in-line/during production. Alternatively, the electrical insulator 110 may be heat-cured or cured using another suitable curing technique (e.g., waiting a specified duration of time), based in part on the material that is used as an encapsulant and/or the specifications for the selected material. By curing the electrical insulator 110, the components of the winding assembly 102 are retained in a fixed position with respect to the electrical insulator 110. In this way, the cured electrical insulator 110 locks or holds the components of the winding assembly 102 (e.g., the primary and secondary windings 104, 106) in a fixed position such that the winding assembly 102 and the electrical insulator 110 (which partially encapsulates only the upper portion of the primary and secondary windings 104, 106) form a single piece. In embodiments using mold 1100, after the electrical insulator 110 is cured (e.g., by exposing the electrical insulator 110 to a UV light), the winding assembly 102 and partially encapsulating electrical insulator 110 are removed from the mold 1100.

The method also includes assembling the primary and secondary windings 104, 106 with one or more magnetic core segments (such as the core segment shown in FIG. 2) which form core 108. In some embodiments, the assembling of the primary and secondary windings 104, 106 with the core 108 occurs after the electrical insulator 110 is applied. In these embodiments, the core segments forming core 108 are coupled to the electrical insulator 110 which partially encapsulates the upper portions of the primary and secondary windings 104, 106. In some embodiments, the core 108 is only coupled to a portion (including portion 132) of electrical insulator 110.

In some embodiments, the method also includes an automated production device, such as a suction or gripper device of a pick and place machine, engaging the electrical insulator 110 to move the transformer 100 from one location to another location. In particular, a pick and place machine engages with the upper surface 112 and/or one or more side surfaces 124 of the transformer 100. For example, during production, it may be desirable to move the transformer from one location to another using an automated production device to automate production and place the transformer 100 on a circuit board. Such a device engages with the electrical insulator 110 to move, adjust, and/or relocate the transformer 100, before or after the core is coupled to the encapsulant.

According to another example embodiment of the present disclosure, an alternate method is disclosed in which the primary and secondary windings 104, 106 are assembled with the core 108 prior to or before the electrical insulator 110 is applied, rather than after. FIG. 13 depicts an alternate method of applying the electrical insulator 110 to a transformer 1300, after the core 108 has been assembled, using a mold 1100. Transformer 1300 is similar to transformer 100 except that the core 108 is assembled prior to applying the electrical insulator 110 instead of after. In particular, the electrical insulator 110 is applied to the transformer 1300 by dispensing the material for the electrical insulator 110 into the mold 1100 and inserting or dipping 1200 the transformer into the mold through the opening 1106. The opening 1106 is sized and shaped to receive the partially inserted transformer 1300 such that the winding assembly 102 of the transformer does not contact the inner surface 1102 and/or the side walls 1104 of the mold 1100. When inserted into the mold 1100, only the upper portion of the primary and secondary windings 104, 106 of the winding assembly 102 are inserted into the electrical insulator 110. In this way, the transformer 1300 and the winding assembly 102 are not fully encapsulated by the electrical insulator 110. Additionally, the transformer 1300 is inserted such that the electrical insulator 110 is applied to at least a portion of the upper surfaces 128, 130 of the core 108. In this manner, the electrical insulator 110 covers at least a portion of the upper surfaces 128, 130 of the core 108 and at least a portion of the winding assembly 102 extending beyond the core 108. The electrical insulator 110 is allowed to cure (e.g., waiting, applying heat, irradiating with UV light, etc.) and the transformer 1300 with the electrical insulator 110 is removed from the mold 1100. The cured electrical insulator 110 retains the components of the transformer 1300 in a fixed position such that the winding assembly 102, the core 108, and the cured electrical insulator 110 form a single piece.

FIGS. 14A and 14B depict the winding assembly 102 with a lower electrical insulator 136 which covers lower portions of the primary and secondary windings 104, 106. The lower electrical insulator 136 does not cover the bus bar terminals 134. In some embodiments, the transformer 100 includes the lower electrical insulator 136 in addition to the electrical insulator 110 to ensure stability and compactness of the winding assembly 102. Even in embodiments including both the electrical insulator 110 and the lower electrical insulator 136, the electrical insulators 110,136 secure the components of the winding assembly 102 (e.g., the primary windings 104, the secondary windings 106, etc.) in a fixed position without entirely encapsulating the winding assembly 102 and/or the transformer 100. For example, the electrical insulator 136 encapsulates only a lower portion of the winding assembly 102 such that electrical insulator 136 does not obstruct a central opening of the winding assembly 102 (i.e., the central post 116 of the core 108 is permitted to pass through the central opening of the winding assembly 102). In some embodiments, the electrical insulator 110 and the lower electrical insulator 136 are spaced apart by at least the dimension of the central opening of the winding assembly 102.

In some embodiments, the lower electrical insulator 136 is composed of an ultraviolet (UV) curable encapsulant material. The UV curable material is cured by irradiating the electrical insulator 136 with a UV light source. In alternate embodiments, the electrical insulator 136 is composed of a heat-curable material and cured by applying heat to the electrical insulator 100. In some embodiments, the electrical insulator 136 is allowed to cure by waiting a sufficient time for the material to cure. Alternatively, the electrical insulator 136 may any suitable material able to retain the winding assembly 102 in a fixed position such that the winding assembly 102 (and the components of the winding assembly 102 including primary and secondary windings 104, 106) cannot move relative to the electrical insulator 136.

The lower electrical insulator 136 is directly coupled to the lower portion of the winding assembly 102, such as by applying a material to the lower portion of the primary and secondary windings 104, 106 and curing the material to form the lower electrical insulator 136. In some embodiments, the lower portion of the winding assembly 102 is inserted into a mold filled with an electrical insulator or encapsulant material and after the material is set or cured, the winding assembly 102 and the encapsulant material are removed from the mold. The mold for the lower electrical insulator 136 includes embedded aligners to ensure proper spacing of the primary and secondary windings 104, 106. To accommodate the bus bar terminals 134, the mold for the lower electrical insulator 136 includes slots which allow the bus bar terminals 134 of the winding assembly 102 to pass through, such that the bus bar terminals 134 are not covered by the lower electrical insulator 136.

As described above, the electrical insulator 110 is suitable for engagement with an automated production device. The electrical insulator 110 may be applied to other electrical components, apart from a transformer, to enable an automated production device to pick up, move, relocate, and/or insert the electrical components as desired. FIGS. 15A and 15B depict an example inductor toroid 138 that includes the electrical insulator 110. The inductor toroid 138 includes a circular ring or donut shaped magnetic core 140 and a winding 142 that includes at least one wire wound around the core 140. The electrical insulator 110 coupled to and covers only an upper portion of the winding 142 (e.g., encapsulating less than half of the winding 142) and does not cover a lower portion of the winding 142. By including a portion of the winding 142 that is not encapsulated, such uncovered portions may facilitate improved heat transfer. The inductor toroid 138 may be used in a wide range of electronic circuits including power supplies, such as SMPS 600. The inductor toroid 138 includes any suitable inductor toroid such as a resonant choke, a common mode choke, a differential choke, a current send, a gate drive transformer or the like.

FIG. 15C depicts an example air cored coil 144, or spring coil, that includes the electrical insulator 110. Similar to the inductor toroid 138, the air cored coil 144 includes a winding 146 that is wrapped around a core, however, the core of the air cored coil 144 is comprised of air or another suitable non-magnetic material. The electrical insulator 110 is coupled to and covers only an upper portion of the winding 146 (e.g., encapsulating less than half of the winding 146) and does not cover a lower portion of the winding 146. By including a portion of the winding 146 that is not encapsulated, such uncovered portions may facilitate improved heat transfer. The air cored coil 144 is any suitable air cored coil or spring coil such as an antenna coil, an inductor coil, etc. The electrical insulator 110 allows the inductor toroid 138 and the air cored coil 144 to be moved by an automated insertion machine and placed, for example, on a circuit board, where the inductor toroid 138 and the air cored coil 144 may be electronically coupled to the circuit board.

Example embodiments described herein may facilitate use of a partially encapsulated quasi-planar transformer for applications that use automated production. For example, the transformer may allow for an automated production device (e.g., a gripper or suction device of a pick and place machine, etc.) to engage with a substantially flat upper surface and/or side portions of the electrical insulator covering during production to move and/or adjust the transformer as desired.

In some embodiments, the assemblies may reduce quality problems encountered during or after assembly (e.g., problems associated with loose windings, core separation, damage to the core or windings such as scratches), because the electrical insulator covering ensures the windings of the transformer are retained in a fixed position relative to the covering. In this manner, hipot problems may be reduced. The electrical insulator covering of the transformer also eliminates the need for tape to be applied to the core to insulate, secure, and/or protect the core and windings, thus eliminating the need for expensive core taping machines for transformer production. Additionally, the electrical insulator eliminates the need for a protective film between the windings and the core. In this way, the assemblies may allow for increased throughput yield and decreased production cost.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An isolated switch-mode power supply, comprising:
   at least one input;
   at least one output; and
   a power circuit coupled between the at least one input and the at least one output for converting an input voltage or current to an output voltage or current;
   the power circuit including a quasi-planar transformer having one or more primary windings, one or more secondary windings, an electrical insulator, and a core magnetically coupling the one or more primary windings and the one or more secondary windings;
   wherein upper portions of the primary and secondary windings are covered with the electrical insulator; and
   wherein the electrical insulator covers less than half of the primary and secondary windings.

2. The power supply of claim 1 wherein lower portions of the primary and secondary windings are not covered by an electrical insulator.

3. The power supply of claim 1 wherein the electrical insulator covers a top surface of the core.

4. The power supply of claim 1 wherein upper portions of the primary and secondary windings extend beyond a top surface of the core;

wherein lower portions of the primary and secondary windings extend beyond a bottom surface of the core; and wherein the electrical insulator defines a substantially flat surface.

5. The power supply of claim 4 wherein the electrical insulator includes side portions that are substantially perpendicular to the substantially flat surface.

6. The power supply of claim 1 wherein the transformer includes bus bar terminals adjacent a bottom surface of the core.

7. The power supply of claim 1 wherein the electrical insulator is disposed between one of the primary windings and one of the secondary windings.

8. The power supply of claim 1 wherein the electrical insulator is disposed between the windings and the core.

* * * * *